United States Patent [19]
Sugawara

[11] Patent Number: 6,008,949
[45] Date of Patent: Dec. 28, 1999

[54] EYEPIECE LENS

[75] Inventor: Saburo Sugawara, Kanagawa-ken, Japan

[73] Assignee: Canon Kabushiki Kaisha, Tokyo, Japan

[21] Appl. No.: 09/193,873

[22] Filed: Nov. 18, 1998

Related U.S. Application Data

[62] Division of application No. 09/000,881, Dec. 30, 1997, which is a continuation of application No. 08/440,983, May 15, 1995, abandoned.

[30] Foreign Application Priority Data

| May 19, 1994 | [JP] | Japan | 6-129709 |
| Jun. 13, 1994 | [JP] | Japan | 6-130304 |
| Jun. 16, 1994 | [JP] | Japan | 6-134197 |

[51] Int. Cl.⁶ .................................................. G02B 25/00
[52] U.S. Cl. .................................... 359/644; 359/643
[58] Field of Search ................................. 359/643, 644

[56] References Cited

U.S. PATENT DOCUMENTS

| 3,233,513 | 2/1966 | Wagner et al. | 359/410 |
| 3,586,418 | 6/1971 | Abe | 359/644 |
| 3,888,567 | 6/1975 | Shoemaker | 359/645 |
| 3,975,088 | 8/1976 | Shoemaker | 359/645 |
| 4,099,842 | 7/1978 | Kaneko | 359/645 |
| 4,286,844 | 9/1981 | Nagler | 359/644 |
| 4,525,035 | 6/1985 | Nagler | 350/410 |
| 5,134,524 | 7/1992 | Hamano et al. | 359/687 |
| 5,255,121 | 10/1993 | Suzuki | 359/643 |
| 5,341,243 | 8/1994 | Okuyama et al. | 359/687 |
| 5,589,976 | 12/1996 | Kanai et al. | 359/362 |
| 5,600,490 | 2/1997 | Sugawara et al. | 359/690 |
| 5,619,379 | 4/1997 | Fukumoto | 359/644 |
| 5,684,635 | 11/1997 | Sugawara | 359/643 |

FOREIGN PATENT DOCUMENTS

| 49-115558 | 11/1974 | Japan . |
| 55-24084 | 6/1980 | Japan . |
| 60-159719 | 8/1985 | Japan . |
| 60-48729 | 10/1985 | Japan . |
| 63-7363 | 2/1988 | Japan . |
| 63-10409 | 3/1988 | Japan . |
| 0815701 | 3/1981 | U.S.S.R. . |

*Primary Examiner*—Georgia Epps
*Assistant Examiner*—Michael A Lucas
*Attorney, Agent, or Firm*—Fitzpatrick, Cella, Harper & Scinto

[57] ABSTRACT

An eyepiece lens is disclosed, in which the total number of constituent lenses is reduced but good optical performance is obtained by setting forth proper rules of design for optical parameters.

5 Claims, 12 Drawing Sheets

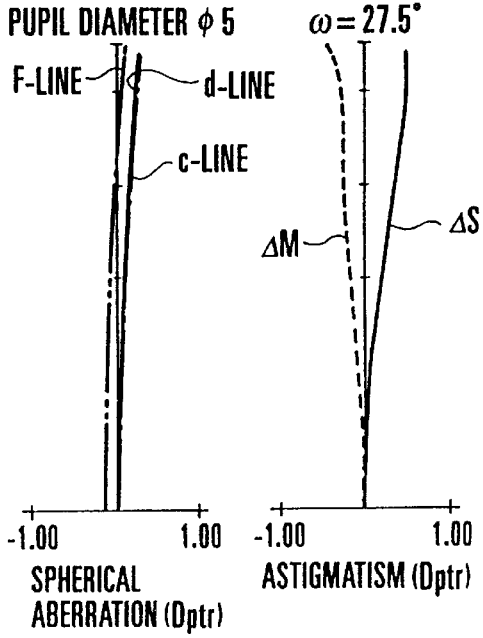
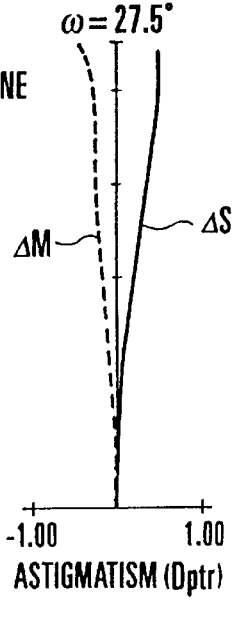
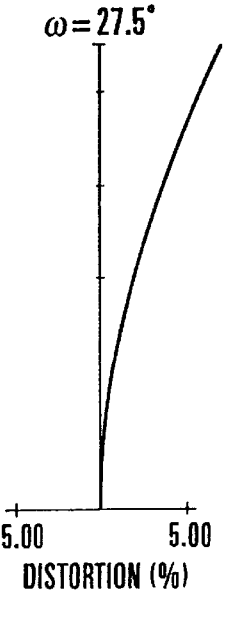
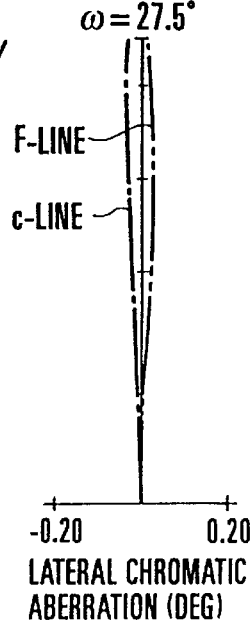
FIG.4A  FIG.4B  FIG.4C  FIG.4D
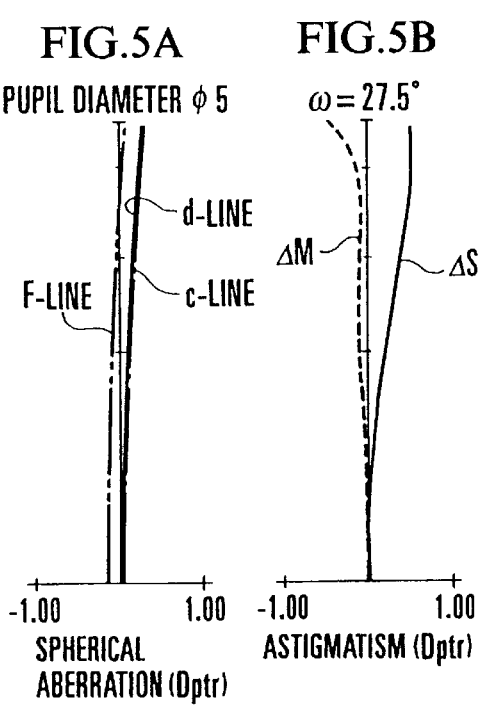
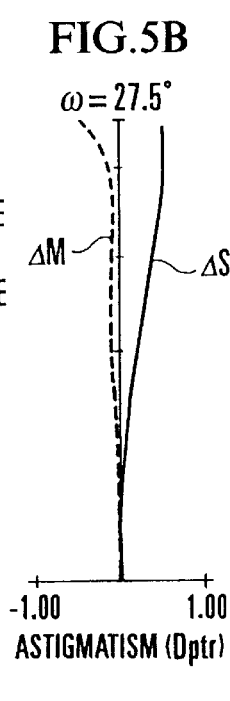
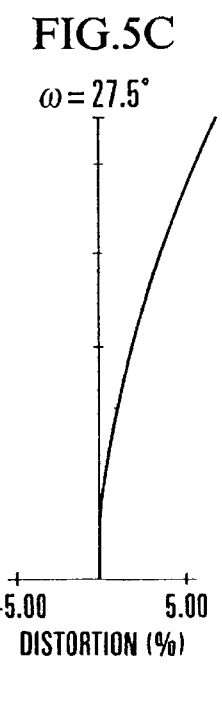
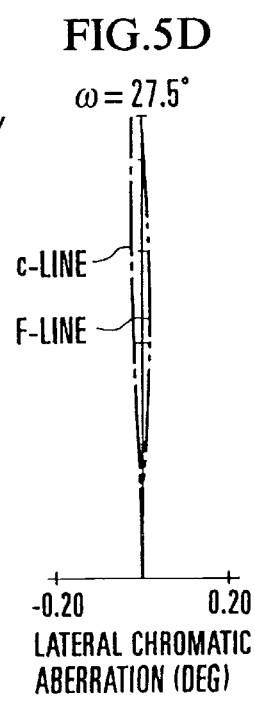
FIG.5A  FIG.5B  FIG.5C  FIG.5D

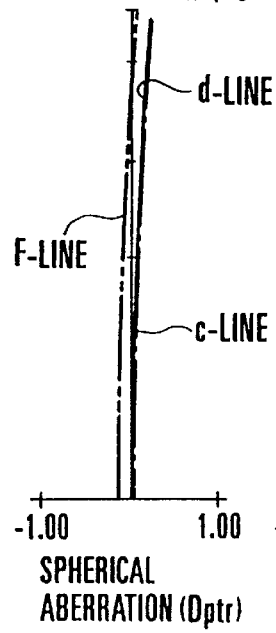
FIG.6A
PUPIL DIAMETER φ5
d-LINE
F-LINE
c-LINE
-1.00      1.00
SPHERICAL
ABERRATION (Dptr)
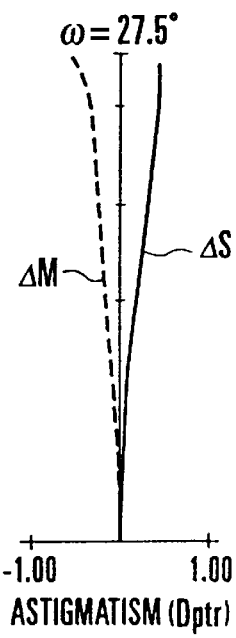
FIG.6B
ω=27.5°
ΔM   ΔS
-1.00      1.00
ASTIGMATISM (Dptr)
FIG.6C
ω=27.5°
-5.00      5.00
DISTORTION (%)
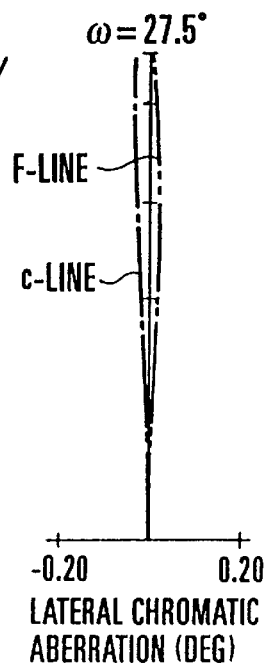
FIG.6D
ω=27.5°
F-LINE
c-LINE
-0.20      0.20
LATERAL CHROMATIC
ABERRATION (DEG)

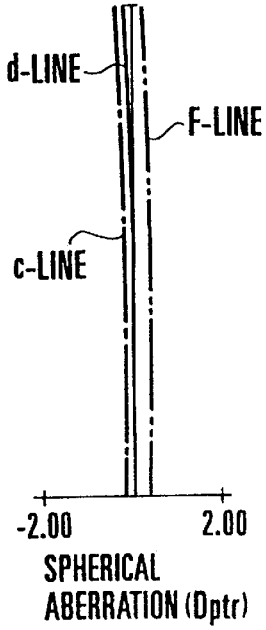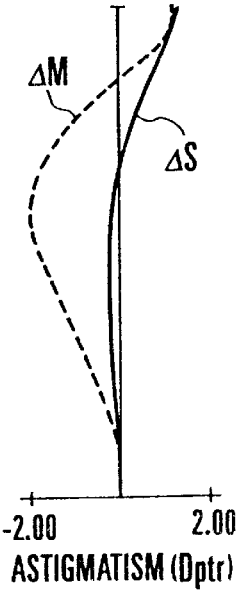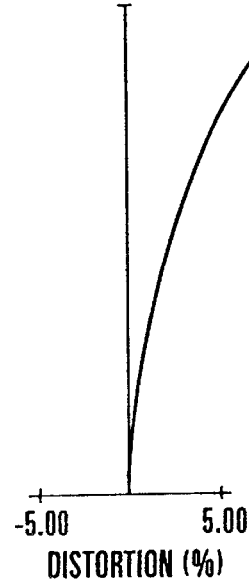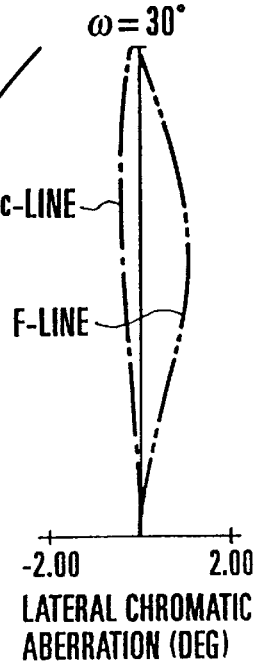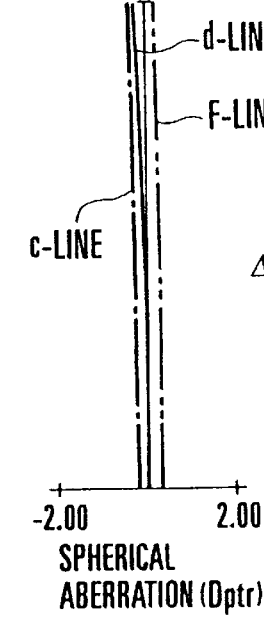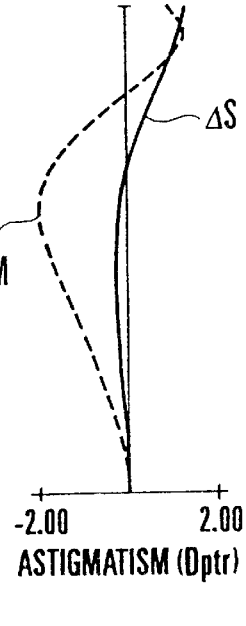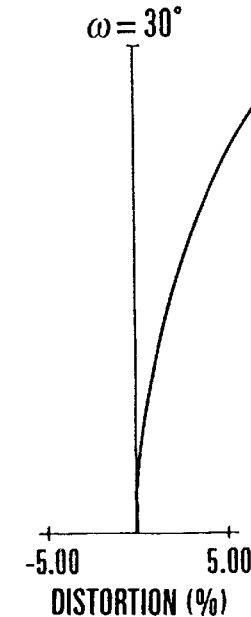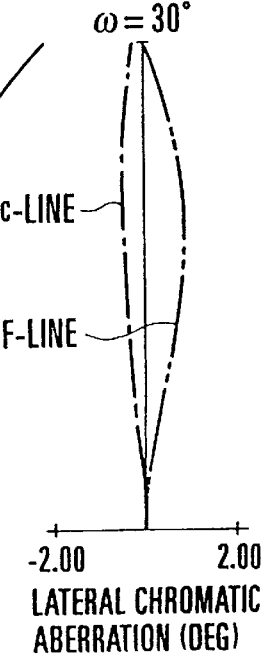

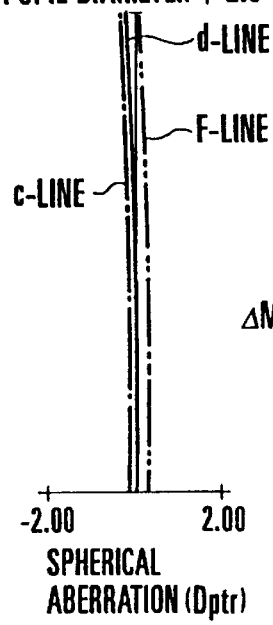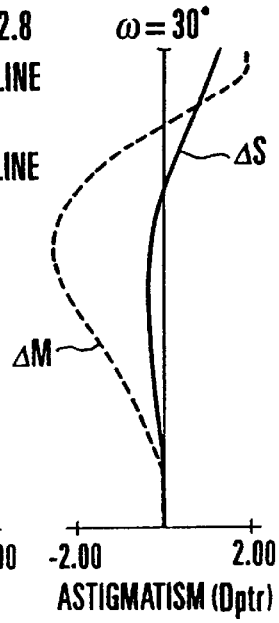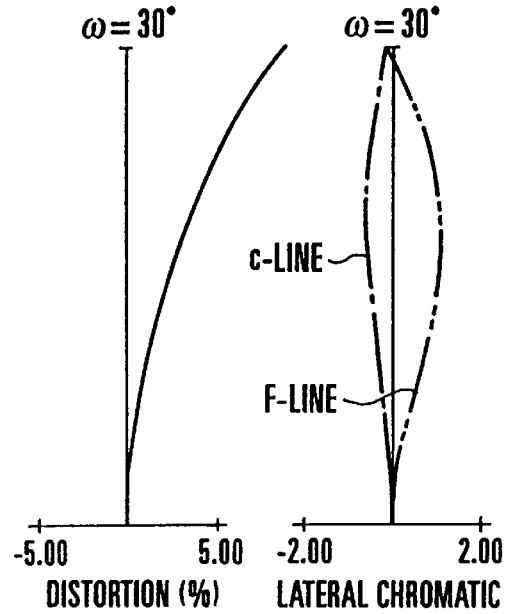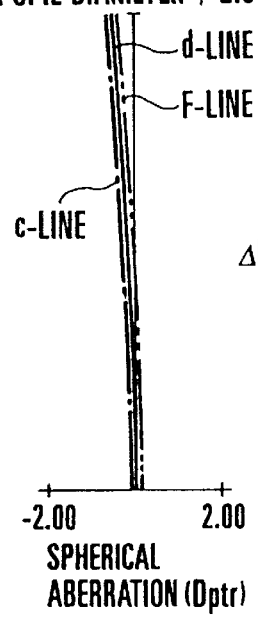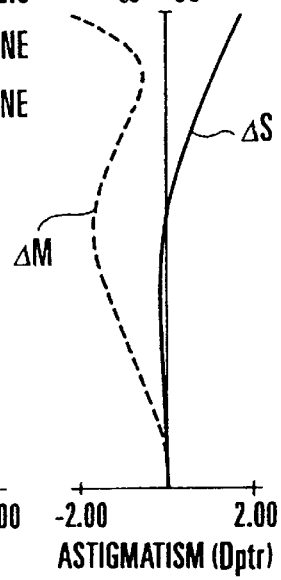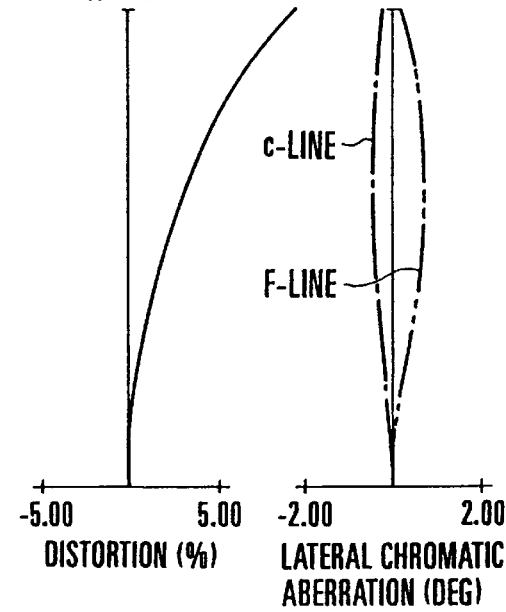

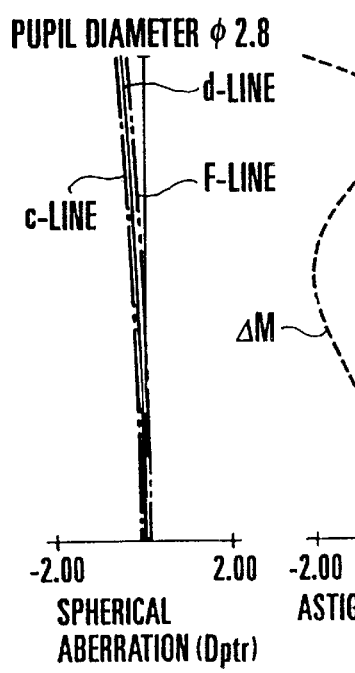
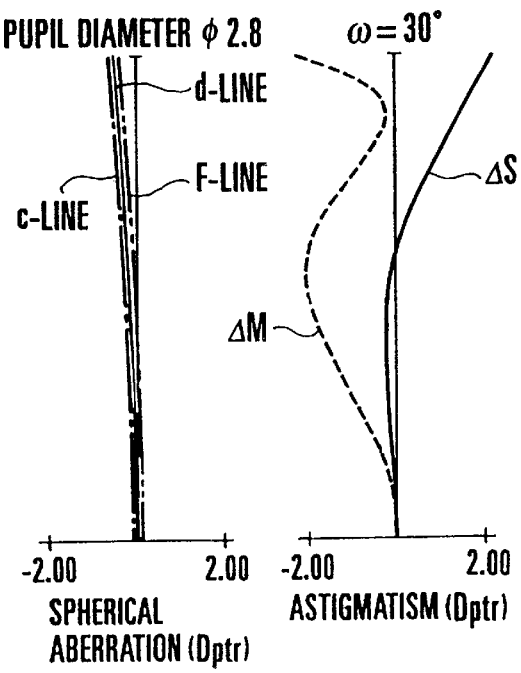
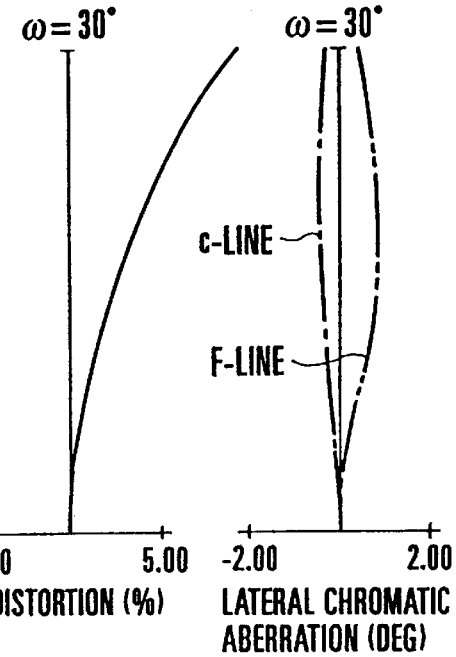
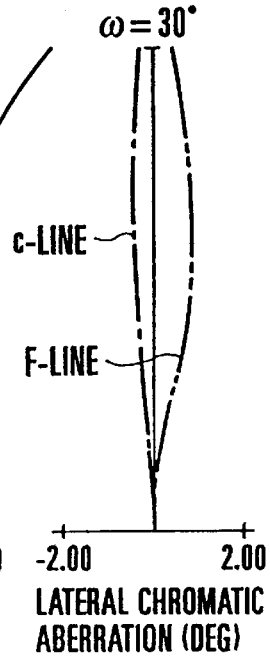
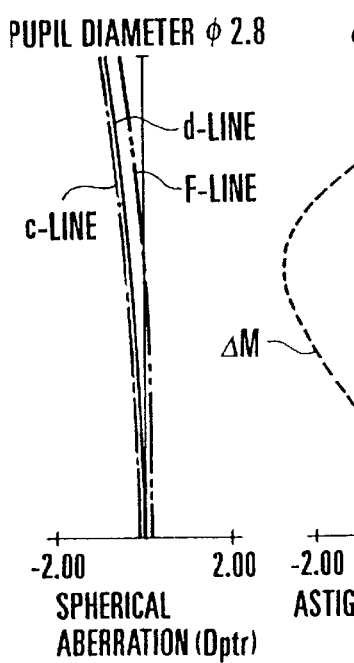
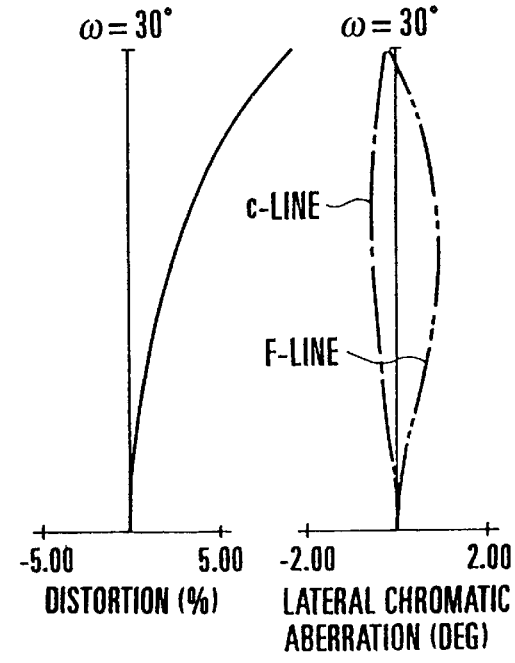
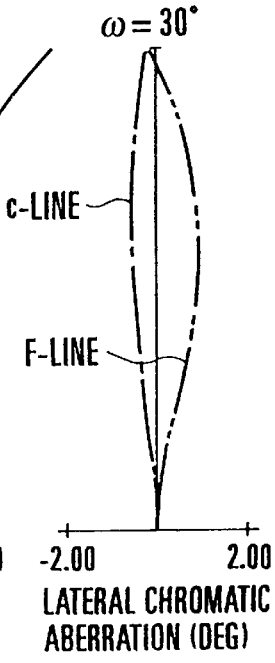

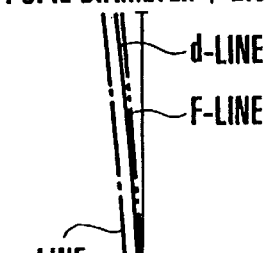
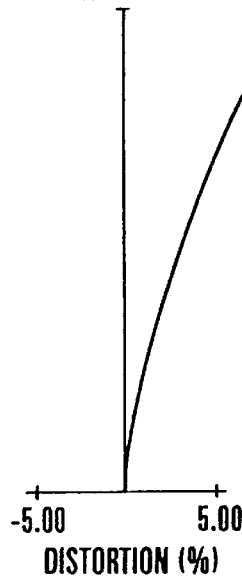
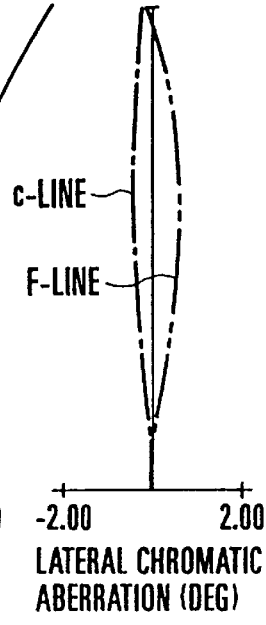

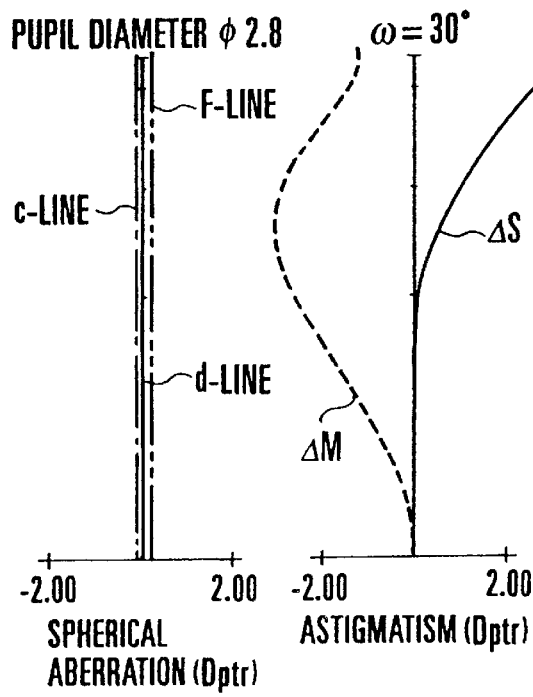
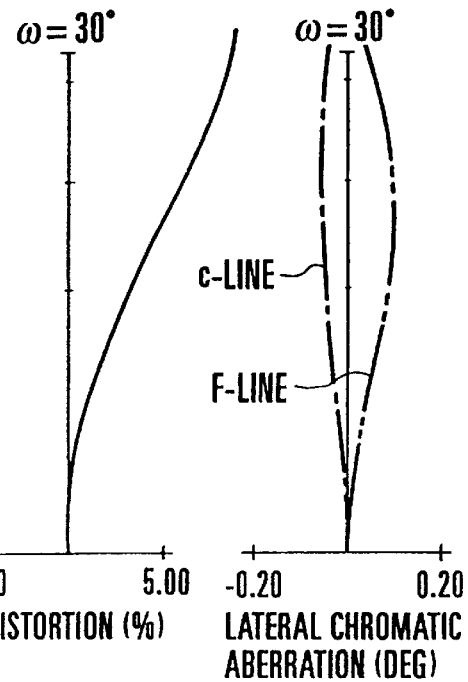
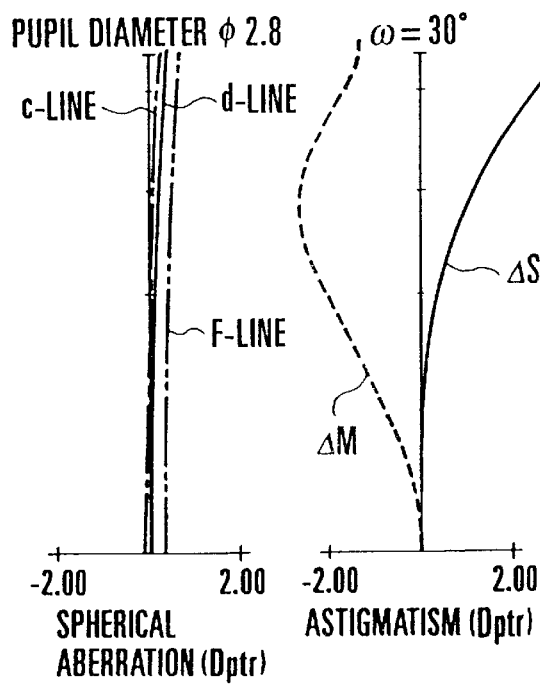
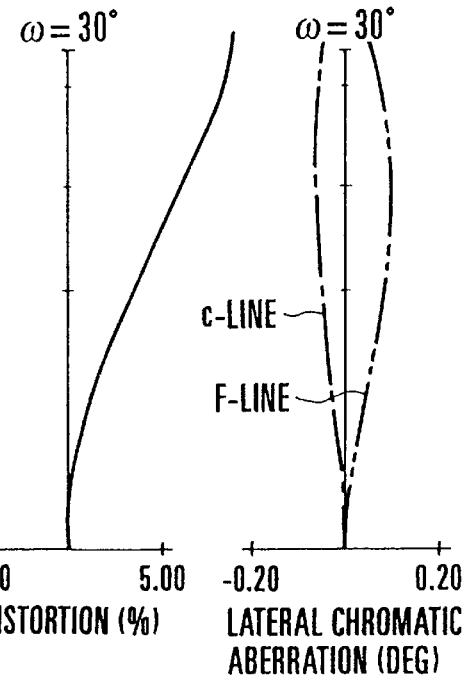

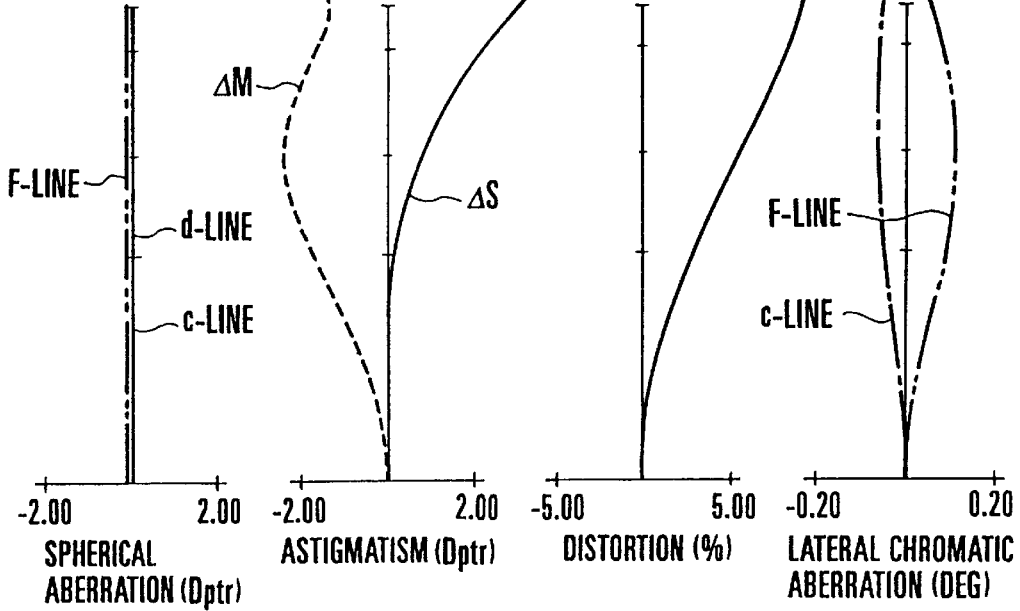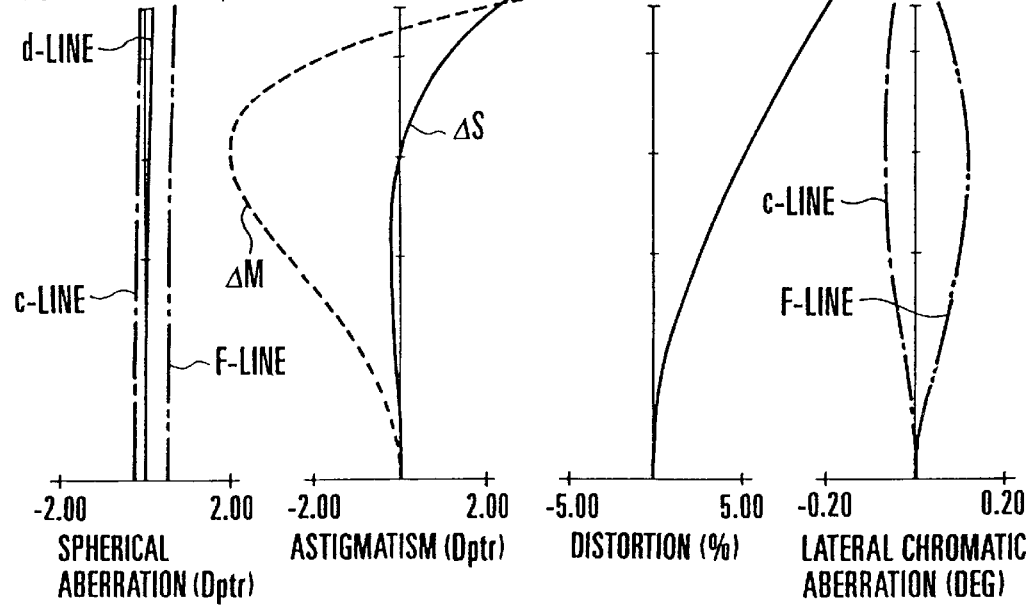

EYEPIECE LENS

This application is a division of application Ser. No. 09/000,881 filed Dec. 30, 1997, which is a continuation of application Ser. No. 08/440,983 filed May 15, 1995, now abandoned.

BACKGROUND OF THE INVENTION

1. Field of the Invention

This invention relates to eyepiece lenses for use in telescopes, binoculars, microscopes and, more particularly, to wide-angle eyepiece lenses which cover a field of about 60°.

2. Description of the Related Art

The eyepiece lens is used to enlarge the apparent field of view when an object on a plane is observed. Of its types, the Erfle and orthoscopic ones are widely known.

For example, Japanese Laid-Open Patent Application No. Sho 49-115558 proposes an eyepiece lens of the orthoscopic type comprised of two groups with four members.

Japanese Patent Publication No. Sho 63-7363 discloses an eyepiece lens of the Erfle type comprising three groups with five members, wherein an increase of the eye-relief is achieved.

Anther Japanese Laid-Open Patent Application No. Sho 60-159719 has made a proposal for widening the apparent angular field to 600 or so, while reducing the astigmatism at the edge of the field to be covered. Another Japanese Patent Publication No. Sho 63-10409 shows an eyepiece lens of widened apparent field of about 60° with relatively small distortion over the entire area of the field to be covered.

Such an eyepiece lens in the Japanese Laid-Open Patent Application No. Sho 60-159719 suffers very large distortion of 16% at a semifield of 30 degrees. Though it is acceptable for astronomical telescopes, the use of this eyepiece lens in the ordinary binocular gives a problem of distorting the image largely.

Also in the Japanese Patent Publication No. Sho 63-10409, the eyepiece lens, though having as small distortion as 3% at a semifield of 30 degrees, gives rise to a problem of increasing the curvature of field and the astigmatism greatly.

In general, with the use of the above-described forms of either the Erfle or the orthoscopic type in the eyepiece lens, when widening the apparent field angle up to 6° and elongating the distance from the back of the eyepiece lens to the pupil of the observer's eye (hereinafter, this distance is called the "eye-relief"), while still maintaining the entire system to be constructed in compact form, the number of lens surfaces of convergent refractivity for the off-axial principal ray is caused to increase. Therefore, it becomes very difficult to correct well all aberrations to obtain a high optical performance.

Meanwhile, an eyepiece lens whose angular field is about 60° with the number of constituent lenses reduced to four or five is proposed in Japanese Laid-Open Patent Application No. Sho 55-24084.

Another proposal for improving the imaging performance of the eyepiece lens with the limitation of the lens number to 4 is disclosed in Japanese Laid-Open Patent Application No. Sho 60-48729.

However, the eyepiece lens proposed in the Japanese Laid-Open Patent Application No. Sho 55-24084, though being of wide-angle, has large field curvature and large astigmatism. In actual use, therefore, the image would probably be blurred at the edge of the field.

The eyepiece lens proposed in the Japanese Laid-Open Patent Application No. Sho 60-48729, though being improved in imagery, has a narrow field angle of 50°. In the embodiment using four constituent lenses, on the other hand, there is a problem that the eye-relief is as short as 60% of the focal length.

SUMMARY OF THE INVENTION

A first object of the invention is to provide an eyepiece lens which, though having as much wide an apparent field angle as 60 degrees or so, is well corrected for various aberrations such as distortion, field curvature and lateral color over the entire area of the field to obtain an image of high quality to be observed.

A second object of the invention is to realize an eyepiece lens of good imagery with the limitation of the number of constituent lenses to a minimum, while still permitting the eye-relief to be made long enough. Particularly, the field curvature and astigmatism are well corrected.

These and other objects of the invention and its features will become apparent from the following description by reference to the drawings.

BRIEF DESCRIPTION OF THE DRAWINGS

FIGS. 4A through 4D show graphic representations of the various aberrations of the numerical example 1 of the invention.

FIGS. 5A through 5D show graphic representations of the various aberrations of the numerical example 2 of the invention.

FIGS. 6A through 6D show graphic representations of the various aberrations of the numerical example 3 of the invention.

FIGS. 14A through 14D show graphic representations of the various aberrations of the numerical example 4 of the invention.

FIGS. 15A through 15D show graphic representations of the various aberrations of the numerical example 5 of the invention.

FIGS. 16A through 16D show graphic representations of the various aberrations of the numerical example 6 of the invention.

FIGS. 17A through 17D show graphic representations of the various aberrations of the numerical example 7 of the invention.

FIGS. 18A through 18D show graphic representations of the various aberrations of the numerical example 8 of the invention.

FIGS. 19A through 19D show graphic representations of the various aberrations of the numerical example 9 of the invention.

FIGS. 20A through 20D show graphic representations of the various aberrations of the numerical example 10 of the invention.

FIGS. 25A through 25D show graphic representations of the various aberrations of the numerical example 11 of the invention.

FIGS. 26A through 26D show graphic representations of the various aberrations of the numerical example 12 of the invention.

FIGS. 27A through 27D show graphic representations of the various aberrations of the numerical example 13 of the invention.

FIGS. 28A through 28D show graphic representations of the various aberrations of the numerical example 14 of the invention.

DETAILED DESCRIPTION OF THE PREFERRED EMBODIMENTS

Figure 1:
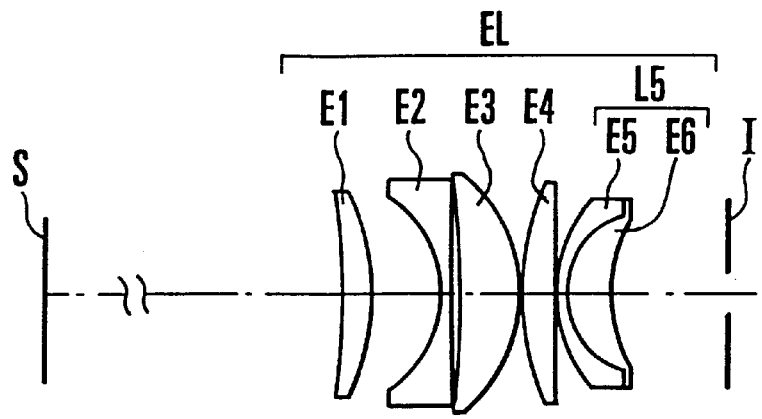
FIG. 1 is a lens block diagram of a numerical example 1 of the invention.
Figure 2:
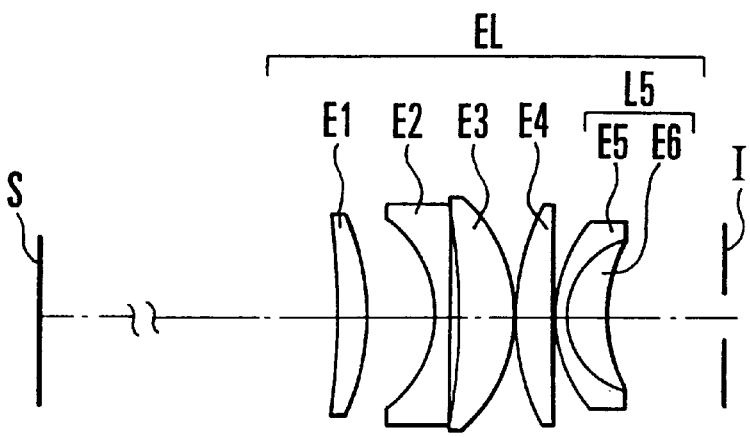
FIG. 2 is a lens block diagram of a numerical example 2 of the invention.
Figure 3:
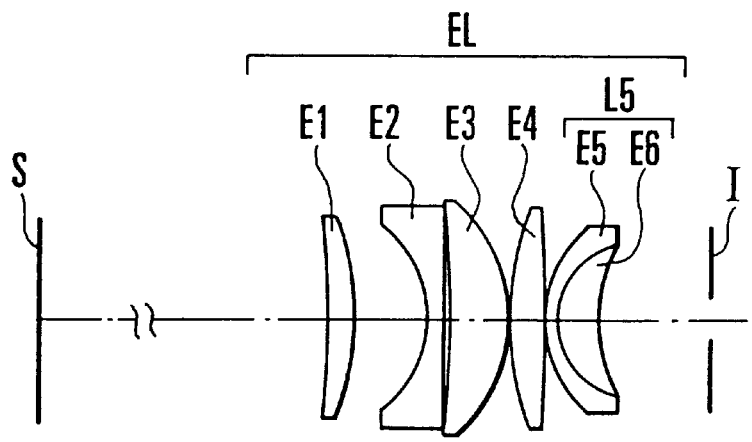
FIG. 3 is a lens block diagram of a numerical example 3 of the invention.
Figure 7:
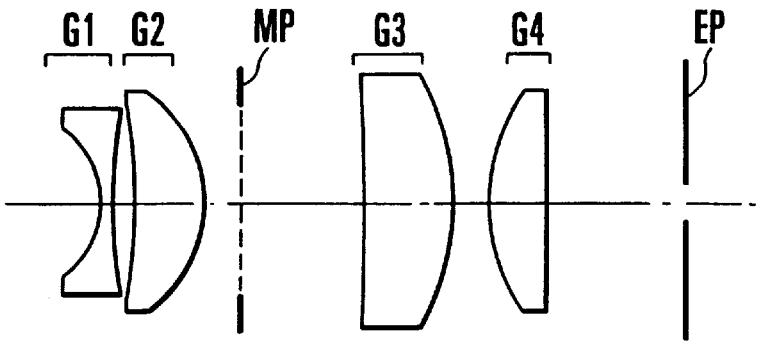
FIG. 7 is a lens block diagram of a numerical example 4 of the invention.
Figure 8:
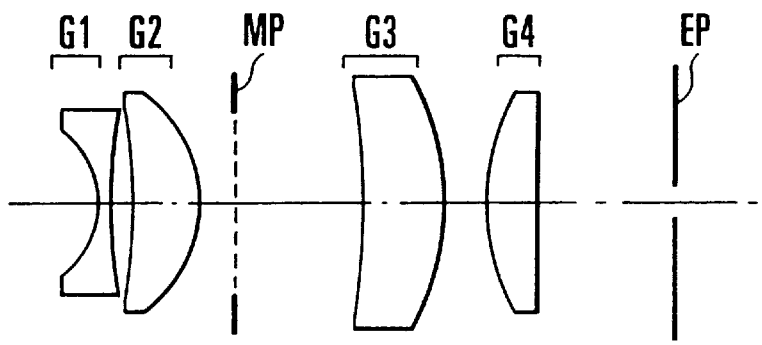
FIG. 8 is a lens block diagram of a numerical example 5 of the invention.
Figure 9:
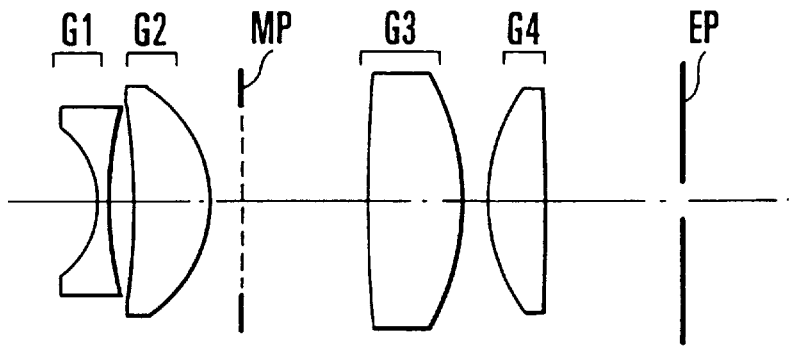
FIG. 9 is a lens block diagram of a numerical example 6 of the invention.
Figure 10:
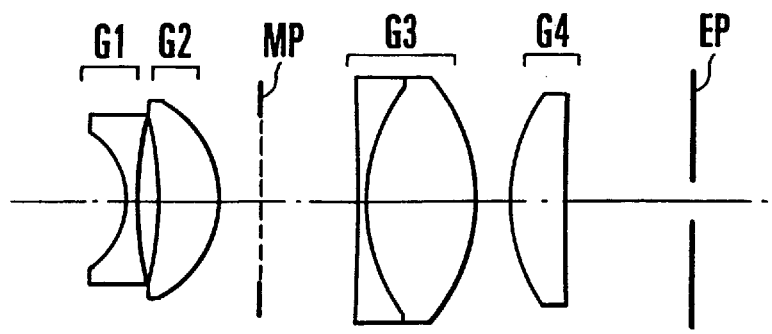
FIG. 10 is a lens block diagram of a numerical example 7 of the invention.
Figure 11:
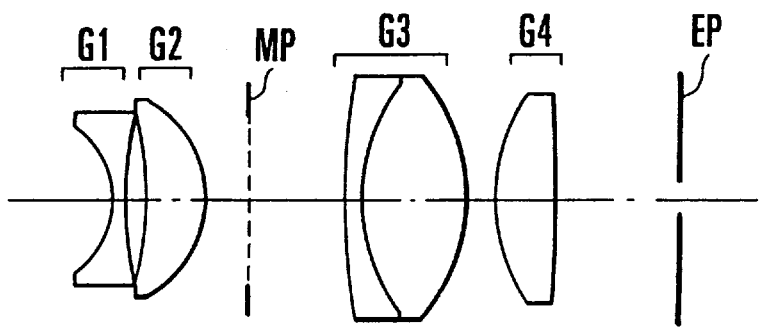
FIG. 11 is a lens block diagram of a numerical example 8 of the invention.
Figure 12:
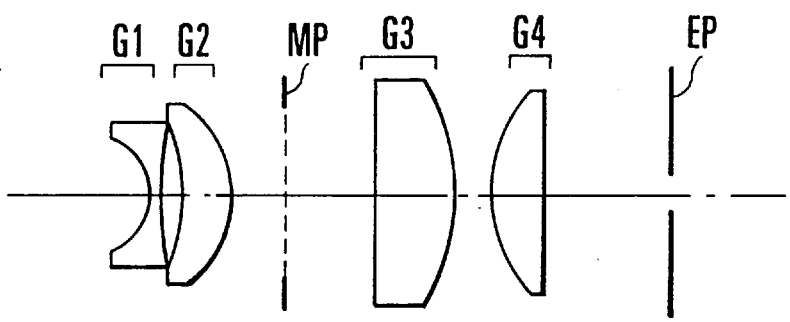
FIG. 12 is a lens block diagram of a numerical example 9 of the invention.
Figure 13:
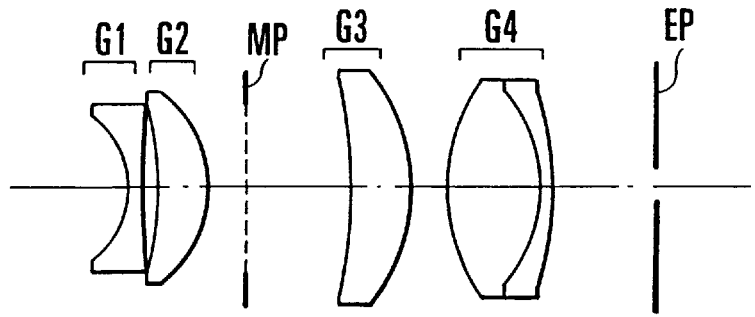
FIG. 13 is a lens block diagram of a numerical example 10 of the invention.
Figure 21:
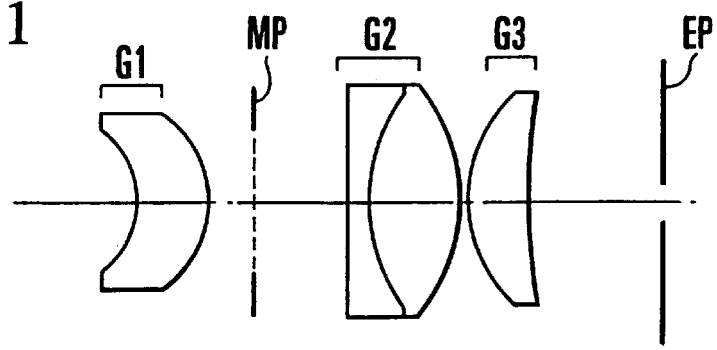
FIG. 21 is a lens block diagram of a numerical example 11 of the invention.
Figure 22:
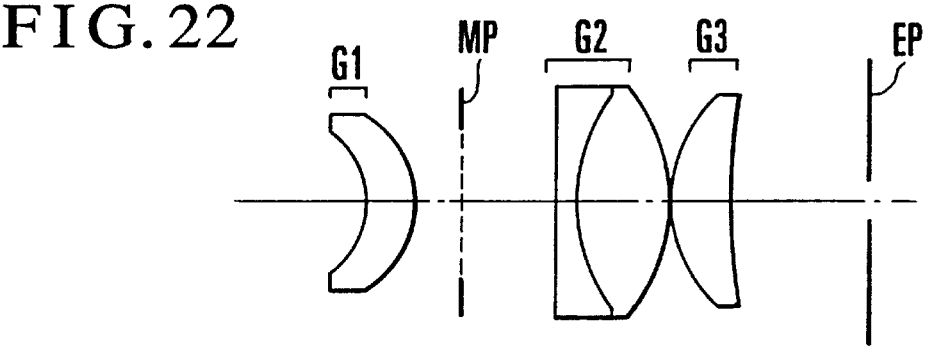
FIG. 22 is a lens block diagram of a numerical example 12 of the invention.
Figure 23:
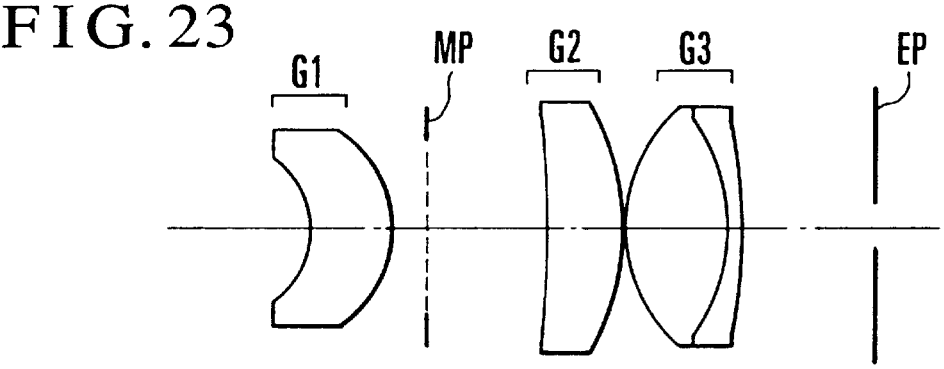
FIG. 23 is a lens block diagram of a numerical example 13 of the invention.
Figure 24:
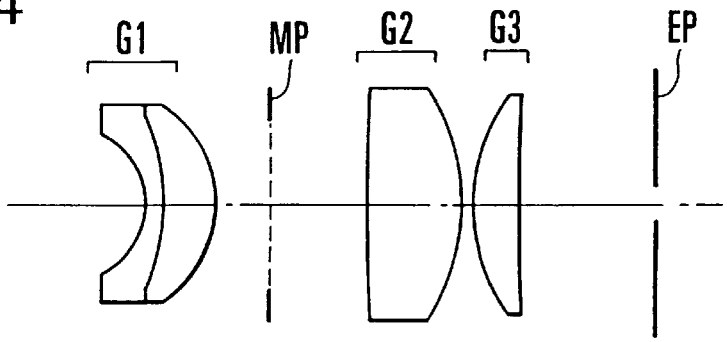
FIG. 24 is a lens block diagram of a numerical example 14 of the invention.

FIGS. 1 to 3 are longitudinal section views of numerical examples 1 to 3 of eyepiece lenses of the invention, respectively. FIGS. 4 to 6 show the aberrations of the eyepiece lenses of FIGS. 1 to 3, respectively.

In these drawings, an observed plane S is looked through the eyepiece lens EL by an observer with the pupil of his or her eye at a position I.

The eyepiece lenses of the numerical examples 1 to 3 are produced as obtained by improving the Erfle type eyepiece lens and have a form that the entrance pupil takes its place at a predetermined position on the observed plane S side of the eyepiece lens, while still permitting the various aberrations including distortion to be corrected well.

The most common eyepiece lens of the Erfle type comprises, in order from the observed plane side, a negative lens having a concave surface facing the observed plane side, a positive lens having a convex surface facing the observing side (observing eye side), these lenses being cemented together to form a meniscus lens, a positive lens, a positive lens having a convex surface facing the observed plane side and a negative lens having a concave surface facing the observing side, the last two lenses being cemented together to form a meniscus lens, thus totaling three units with five elements.

The Erfle type eyepiece lens of such configuration gets a form suited to widen the apparent angular field and is well corrected for coma, field curvature and lateral chromatic aberration.

In such an Erfle type eyepiece lens, however, for the principal ray of the off-axial beam that goes from the edge of the field on the observed plane to the pupil of the eye, the closest lens surface to the observed plane strongly refracts it in a direction to the outer periphery of the lens. Then, by the later successive lens surfaces, the principal ray is refracted gradually toward the optical axis, reaching the pupil of the eye. With this arrangement of the lens units, therefore, large distortion, particularly of the pincushion type, becomes liable to be produced.

So, for the numerical examples 1 to 3 of the invention, this Erfle type eyepiece lens is improved by inserting to the observed plane side a positive lens E1 of such shape that its strong positive refracting surface faces the observing side, specifically speaking, of meniscus shape convex toward the observing side.

Incidentally, the term "strong" power or refracting surface herein used means that this surface is stronger in power or refractivity than the opposite surface.

This leads chiefly to increase the barrel type distortion produced by the lens surface on the observing side of the positive lens E1, thus well correcting distortion. The use of this lens E1 also elongates the overall focal length of all the constituent lenses which lie on the observing side, which in turn increases the eye-relief.

A lens E2 is made negative in power with its strong negative refracting surface facing the observed plane side compared with the observing side, causing an optical system of that lens E2 through a lens E6 to shift its principal point of the observing side toward the observing side, which in turn increases the eye-relief.

Another feature is that the fifth lens unit L5 is formed to a meniscus shape convex toward the observed plane side so that the field curvature which would otherwise increase in the negative direction is well corrected.

Yet another feature which is particularly characteristic of the invention is that the eyepiece lens comprises, in order from the observed plane side, a positive lens E1 having a strong positive refracting surface facing the observing side, a negative lens E2 having a strong negative refracting surface facing the observed plane side, a positive lens E3 having a strong positive refracting surface facing the observing side, a positive lens E4 and a fifth lens unit L5 of meniscus shape convex toward the observed plane side, wherein, letting the radius of curvature of the i-th lens surface, when counted from the observed plane side, be denoted by Ri, the i-th axial lens thickness or air separation by Di and the focal length of the entire system by f, $$1.8 \leq R2/R3 < 3 \quad (1)$$

$$0.3 \leq D2/f < 0.45 \quad (2)$$

are satisfied to thereby obtain a good optical performance.

Particularly for the fifth lens unit L5, the characteristic feature is that it is made up in the form of a cemented lens composed of a negative lens E5 of meniscus shape convex toward the observed plane side and a positive lens E6 of meniscus shape convex toward the observed plane side cemented together at their adjoining surfaces.

The technical significance of the above-described conditions (1) and (2) are explained below.

The inequalities of condition (1) give a range for the ratio of the radius of curvature of the lens surface on the observing side of the meniscus shaped lens E1 on the most observed plane side to the radius of curvature of that lens surface of the lens E2 which is adjacent to it, or on the observed plane side. Since these two lens surfaces have strong curvatures to correct distortion, because the astigmatism and field curvature they produce lie in the relationship of canceling each other, these aberrations are corrected well.

When the lower limit of the condition (1) is exceeded, as this implies that the radius of curvature of the lens surface on the observing side of the lens E1 is too small, the field curvature and astigmatism become objectionably much too large. Conversely when the upper limit is exceeded, as this implies that the radius of curvature of the lens surface on the observing side of the lens E1 is too large, it becomes difficult to correct distortion of higher order. Also because the radius of curvature of the lens surface on the observed plane side of the lens E2 is relatively too small, it becomes difficult to correct coma.

The inequalities of condition (2) give a range for the ratio of the air spacing between the lens E1 and the lens E2 to the focal length of the entire system.

In a range beyond the lower limit of the condition (2), under-correction of distortion results. So, this is no good. In a range beyond the upper limit of the condition (2), good correction of distortion can be done, but the eye-relief decreases objectionably.

Incidentally, in the present embodiment, it is within the ranges of the conditions (1) and (2) that the height of incidence, ha, of the principal ray of the off-axial beam on the lens surface on the observing side of the lens E1 is made higher than that ha of the principal ray on the adjacent lens surface to it, or on the observed plane side of the lens E2, so that the distortion is corrected well.

The above-described features or conditions suffice for accomplishing the objects of the invention. To further improve the various aberrations resulting from the increase of the angular field to be covered for the purpose of obtaining a high optical performance, it is recommended to satisfy at least one of the following sets of conditions (i) to (iv).

(i) Letting the focal length of the lens Ei be denoted by fi, a condition (3) is to satisfy:

$$1 < f5/f2 < 2 \quad (3)$$

The inequalities of condition (3) give a range for the ratio of the focal length of the lens E5 to the focal length of the lens E2. In a range beyond the lower limit of the condition (3), because the power of the lens E2 is relatively weak, the eye-relief shortens objectionably.

In a range beyond the upper limit of the condition (3), because the power of the lens E2 is relatively too strong, lateral chromatic aberration of higher order increases objectionably.

(ii) Letting the refractive index and Abbe number of the material of the i-th lens Ei described before be denoted by vi and ni respectively, and the mean values of the refractive indices and Abbe numbers of the materials of the positive lenses in the eyepiece lens by vP and nP, respectively, the following conditions:

$$0.05 < NP-N2 < 0.16 \quad (4)$$

$$10 < vP-v2 < 25 \quad (5)$$

are to be satisfied.

The inequalities of conditions (4) and (5) give ranges for the optical characteristics of the negative lens E2.

In a range beyond the lower limit of the condition (4), under-correction of field curvature results. In a range beyond the upper limit of the condition (4), because the refractive index of the material of the lens E2 is relatively too small with the result that the radius of curvature of the lens surface on the observed plane side of the lens E2 gets small, it becomes difficult to correct coma aberration.

In a range beyond the lower limit of the condition (5), under-correction of longitudinal and lateral chromatic aberrations results. In a range beyond the upper limit, over-correction of longitudinal and lateral chromatic aberrations results. So, these are no good.

(iii) Letting the refractive index and Abbe number of the material of the i-th lens Ei described before be denoted by Ni and vi and the mean values of the refractive indices and Abbe numbers of the materials of the positive lenses in the eyepiece lens by NP and vP, the following conditions:

$$0.05 < N5-NP < 0.18 \quad (6)$$

$$20 < vP-v5 < 35 \quad (7)$$

are to be satisfied.

The inequalities of conditions (6) and (7) give ranges for the optical characteristics of the meniscus-shaped negative lens E5.

In a range beyond the lower limit of the condition (6), under-correction of spherical aberration results. In a range beyond the upper limit, under-correction of field curvature results. So, these are no good.

In a range beyond the lower limit of the condition (7), under-correction of longitudinal and lateral chromatic aberrations results. In a range beyond the upper limit, over-correction of longitudinal and lateral chromatic aberrations results. So, these are no good.

(iv) The lens E1 is formed to a meniscus shape convex toward the observing side. By this, various aberrations are well corrected over the entire area of the angular field.

Next, three numerical examples of the invention are shown. In the numerical data for the examples 1 to 3, Ri is the radius of curvature of the i-th lens surface, when counted from the observed plane side, Di is the i-th axial lens thickness or air separation, when counted from the observed plane side, and Ni and vi are respectively the refractive index and Abbe number of the glass of the i-th lens element, when counted from the observed plane side.

The values of the factors of the before-described conditions (1) to (7) for the numerical examples 1 to 3 are listed in Table-1.

Numerical Example 1:
f = 25.0; Pupil Diameter: φ5; 2ω = 55°

| R1 = | −102.02 | D1 = | 3.92 | N1 = 1.83400 | v1 = 37.2 |
|---|---|---|---|---|---|
| R2 = | −32.00 | D2 = | 8.50 | | |
| R3 = | −15.50 | D3 = | 1.80 | N2 = 1.62004 | v2 = 36.3 |
| R4 = | 2199.12 | D4 = | 0.82 | | |
| R5 = | −139.43 | D5 = | 7.86 | N3 = 1.71300 | v3 = 53.8 |
| R6 = | −20.32 | D6 = | 0.20 | | |
| R7 = | 35.37 | D7 = | 4.57 | N4 = 1.77250 | v4 = 49.6 |
| R8 = | 344.79 | D8 = | 0.20 | | |
| R9 = | 19.15 | D9 = | 1.50 | N5 = 1.84666 | v5 = 23.8 |
| R10 = | 11.10 | D10 = | 5.40 | N6 = 1.71300 | v6 = 53 8 |
| R11 = | 19.92 | | | | |

Eye-Relief: 15

Numerical Example 2:
f = 24.9; Pupil Diameter: φ5; 2ω = 55°

| R1 = | −121.38 | D1 = | 3.78 | N1 = 1.83400 | v1 = 37.2 |
|---|---|---|---|---|---|
| R2 = | −34.00 | D2 = | 9.00 | | |
| R3 = | −15.00 | D3 = | 1.80 | N2 = 1.62004 | v2 = 36.3 |
| R4 = | −893.31 | D4 = | 0.93 | | |
| R5 = | −100.38 | D5 = | 7.56 | N3 = 1.71300 | v3 = 53.8 |
| R6 = | −19.74 | D6 = | 0.20 | | |
| R7 = | 35.37 | D7 = | 4.74 | N4 = 1.77250 | v4 = 49.6 |
| R8 = | 1142.42 | D8 = | 0.20 | | |
| R9 = | 19.49 | D9 = | 1.50 | N5 = 1.84666 | v5 = 23.8 |

-continued

| R10 = | 11.00 | D10 = | 5.40 | N6 = 1.71300 | ν6 = 53.8 |
| R11 = | 20.47 | | | | |
| Eye-Relief: 15 | | | | | |

Numerical Example 3:
f = 25.0; Pupil Diameter: φ5; 2ω = 55°

| R1 = | −133.79 | D1 = | 3.74 | N1 = 1.83400 | ν1 = 37.2 |
| R2 = | −36.00 | D2 = | 9.50 | | |
| R3 = | −15.36 | D3 = | 1.80 | N2 = 1.64769 | ν2 = 33.8 |
| R4 = | −710.79 | D4 = | 0.63 | | |
| R5 = | −138.23 | D5 = | 7.51 | N3 = 1.77250 | ν3 = 49.6 |
| R6 = | −20.83 | D6 = | 0.20 | | |
| R7 = | 45.44 | D7 = | 4.55 | N4 = 1.77250 | ν4 = 49.6 |
| R8 = | −295.68 | D8 = | 0.20 | | |
| R9 = | 18.13 | D9 = | 1.50 | N5 = 1.84666 | ν5 = 23.8 |
| R10 = | 10.80 | D10 = | 5.40 | N6 = 1.71300 | ν6 = 53.8 |
| R11 = | 18.92 | | | | |
| Eye Relief: 15 | | | | | |

TABLE 1

| | Numerical Example | | |
|---|---|---|---|
| Condition | 1 | 2 | 3 |
| (1) R2/R3 | 2.07 | 2.27 | 2.34 |
| (2) D2/f | 0.34 | 0.36 | 0.38 |
| (3) f5/f2 | 1.37 | 1.32 | 1.43 |
| (4) NP-N2 | 0.14 | 0.14 | 0.13 |
| (5) νP-ν2 | 12.35 | 12.35 | 13.75 |
| (6) N5-NP | 0.09 | 0.09 | 0.07 |
| (7) νP-ν5 | 24.8 | 24.8 | 23.8 |

According to the invention, the design rules are set forth for the parameters described before, thereby making it possible to achieve an eyepiece lens of widened apparent angular field to 60 degrees or so, while still permitting distortion, field curvature, lateral color and other aberrations to be corrected well over the entire area of the widened angular field to obtain an image of high quality to be observed.

Another embodiment of the eyepiece lens according to the invention in which the number of constituent lenses is reduced but good optical performance can be obtained, is described by reference to the drawings below.

FIG. 7 to FIG. 13 are lens block diagrams of numerical examples 4 to 10 of the invention to be described later.

The eyepiece lens comprises a first lens unit G1 consisting of one negative lens having a strong power on the light entrance side, a second lens unit G2 consisting of one positive lens having a strong power on the light exit side, followed, after a middle image position MP, by a third lens unit G3 of positive refractive power having a strong power on the light exit side and a fourth lens unit G4 of positive refractive power having a strong power on the light entrance side.

As is understandable from the above, in this embodiment, the total number of constituent lenses is fewer than that in the foregoing embodiment.

In a space up to the middle image position, there are arranged the first lens unit of negative refractive power and the second lens unit of positive refractive power in this order from the light entrance side. The reasons for this are that the off-axial rays are made high from the optical axis at the middle image position to thereby elongate the eye-relief and that the opposite aberrations to those field curvature and astigmatism which will be produced on the light exit side of the middle image position are caused to be produced so that, as a whole, the field curvature and astigmatism are reduced. In more detail, if the entire system is arranged on both sides of an image plane for the objective lens (not shown), or the constituent lenses are distributed over the light entrance and exit sides of the middle image position, the upper part of the off-axial light beam as viewed from the principal ray thereof on the light entrance side becomes the lower part of the off-axial beam on the light exit side, while the lower part of the off-axial light beam on the light entrance side becomes the upper part of the off-axial light beam on the light exit side. Therefore, opposite aberrations are produced on either side of the middle image position, thus assuring good correction of aberrations.

From the middle image position to the light exit side, there are further arranged the third lens unit of positive refractive power and the fourth lens unit of positive refractive power. The reason for this is to enlarge the image in the air at the middle image position.

Further, the reason why the power of the light entrance side of the first lens unit and the power of the light exit side of the second lens unit are made strong is that the off-axial light rays are elevated higher to take a long eye-relief.

Further, the reason that the power of the light exit side of the third lens unit and the power of the light entrance side of the fourth lens unit are made strong is to minimize coma aberration.

Moreover, it is desirable to satisfy the following condition:

$$0.85 < -f2/f1 < 2.5 \tag{8}$$

where f1: the focal length of the first lens unit; and f2: the focal length of the second lens unit Further, it is desirable to satisfy the following conditions:

$$0.3 < SF1 < 1.3 \tag{9}$$

$$-4 < SF2 < -0.8 \tag{10}$$

$$0.15 < n2 - n1 \tag{11}$$

where

SF1=(r2+r1)/(r2−r1)

SF2=(r4+r3)/(r4−43)

wherein ri: the radius of curvature of the i-th lens surface from the light entrance side; and ni: the refractive index of the i-th lens from the light entrance side Further, it is desirable that the third lens unit is contructed with one positive lens having a strong power on the light exit side and the fourth lens unit is constructed with one positive lens having a strong power on the light entrance side.

Furthermore, it is desirable to satisfy the following condition:

$$25 < \nu a - \nu 2 < 60 \tag{12}$$

where

νa=(ν1+ν3+ν4)/3 wherein νi: the Abbe number of the i-th lens unit

Moreover, it is desirable that at least one of the third and fourth lens units is a cemented lens consisting of a negative lens and a positive lens cemented together. Further, if the third lens unit is the cemented lens, it is desirable that the negative and positive lenses, when cemented together, are arranged in this order from the light entrance side.

At this time, it is desirable to satisfy the following condition:

$$15 < vb - vc < 40 \quad (13)$$

where vb: the mean value of the Abbe numbers of the first lens unit, of the positive lens in the third lens unit and of the positive lens in the fourth lens unit; and vc: the mean value of the Abbe numbers of the second lens unit and of the negative lens in the third or fourth lens unit Within the construction and arrangement described above, it is desirable to satisfy the following additional conditions:

$$-4 < SF3 < -0.1 \quad (14)$$

$$0.2 < SF4 < 3 \quad (15)$$

where

SF3=(r3$e$+r3$i$)/(r3$e$−r3$i$)

SF4=(r4$e$+r4$i$)/(r4$e$−r4$i$)

wherein r3$i$: the radius of curvature of the lens surface closest to the light entrance side in the third lens unit;

r3$e$: the radius of curvature of the lens surface closest to the light exit side in the third lens unit;

r4$i$: the radius of curvature of the lens surface closest to the light entrance side in the fourth lens unit; and r4$e$: the radius of curvature of the lens surface closest to the light exit side in the fourth lens unit The significance of these conditions and their limits are explained below.

The inequalities of condition (8) give a range for the ratio of the focal lengths of the first and second lens units. In a range beyond the lower limit of the condition (8), because the power of the first lens unit is too weak, the eye-relief shortens and under-correction of field curvature results. So, it is no good. In a range beyond the upper limit of the condition (8), coma is produced to too large an amount. So, it is no good. Incidentally, it is preferred to narrow the range of the condition (8) by altering either or both of the upper and lower limits to 1.0<−f2/f1<2.0 or thereabout, so that the aberrations are improved.

The inequalities of condition (9) regulate the shape of the first lens unit. In a range beyond the lower limit of the condition (9), because the power of the surface r1 is too weak, the eye-relief becomes short. In a range beyond the upper limit of the condition (9), because the curvature of the surface r1 is too small, coma increases objectionably. The acceptable range may be narrowed by altering either or both of the limits to 0.45<SF1<0.9. If so, better results are attained in respect to the eye-relief and aberration correction.

The inequalities of condition (10) regulate the shape of the second lens unit. In a range beyond the lower limit of the condition (10), the eye-relief becomes short. In a range beyond the upper limit of the condition (10), astigmatism increases objectionably. Incidentally, the acceptable range may be narrowed by altering either or both of the upper and lower limits to −3.5<SF2<−1 or thereabout. If so, better results are attained in respect to the eye-relief and aberration correction.

The inequality of condition (11) gives a range for the difference between the refractive indices of the first and second lens units. Outside the range of the condition (11), under-correction of field curvature results. Incidentally, 0.2<n2−n1 or like modification is preferred on the aberration correction.

The inequalities of condition (12), on assumption that the third and fourth lens units each consist of one positive lens, give a range for the difference between the Abbe number of the second lens unit and the mean value of the Abbe numbers of the first, third and fourth lens units. Outside the range of this condition, longitudinal chromatic aberration is over-corrected objectionably. To avoid this, only the Abbe number of the second lens unit is decreased, so that the chromatic aberrations are corrected.

Incidentally, it is preferred from the standpoint of the aberration correction to vary the inequalities (12) to 30<va−v2<50, as either or both of the upper and lower limits is or are contracted.

The inequalities of condition (13), on assumption that at least one of the third and fourth lens units is a cemented lens, give a range for the difference between the mean value of the Abbe numbers of the first lens unit, the positive lens in the third lens unit and the positive lens in the fourth lens unit and the mean value of the Abbe numbers of the second lens unit and the negative lens in the third or fourth lens unit. In a range beyond the lower limit of the condition (13), under-correction of lateral chromatic aberration results. In a range beyond the upper limit of the condition (13), over-correction of lateral chromatic aberration results. So, these are no good. Incidentally, it is more preferred on aberration correction to contract either or both of the upper and lower limits of the inequalities (13) to such as 20<vb−vc<35.

The inequalities of conditions (14) and (15) regulate the shapes of the third and fourth lens units. Outside the ranges of the conditions (14) and (15), coma increases objectionably. Incidentally, it is more preferred on aberration correction to contract either or both of the upper limits of the inequalities (14) to −3<SF3<−0.3, or of the inequalities (15) to 2<SF4<2.5.

For the case that the third lens unit is a cemented lens, it is desirable that the negative lens and the positive lens, when cemented together, are arranged in this order from the light entrance side, because the eye-relief can be made even longer.

Seven numerical examples of the invention are shown. In the numerical data for the examples 4 to 10, ri: the radius of curvature of the i-th lens surface from the light entrance side;

di: the i-th axial separation between the lens surfaces from the light entrance side;

ni: the refractive index of the i-th lens from the light entrance side; and vi: the Abbe number of the i-th lens from the light entrance side.

Numerical Example 4:

| Numerical Example 4: f = 11.08; Pupil Diameter: φ2.8; 2ω = 60° | | | | | | | |
|---|---|---|---|---|---|---|---|
| r1 = | −7.540 | d1 = | 1.08 | n1 = 1.51633 | v1 = 64.2 |
| r2 = | 34.621 | d2 = | 1.55 | | |
| r3 = | 50.291 | d3 = | 5.60 | n2 = 1.84666 | v2 = 23.8 |
| r4 = | −10.866 | d4 = | 12.50 | | |
| r5 = | −269.192 | d5 = | 7.18 | n3 = 1.60311 | v3 = 60.7 |
| r6 = | −20.628 | d6 = | 2.85 | | |

-continued

| | | | | | |
|---|---|---|---|---|---|
| r7 = | 16.713 | d7 = | 4.45 | n4 = 1.60311 | v4 = 60.7 |
| r8 = | −562.498 | d8 = | 10.80 (Eye-Relief) | | |
| r9 = | ∞ | | | | |

Numerical Example 5:
f = 11.06; Pupil Diameter: φ2.8; 2ω = 60°

| | | | | | |
|---|---|---|---|---|---|
| r1 = | −7.475 | d1 = | 1.08 | n1 = 1.48749 | v1 = 70.2 |
| r2 = | 30.120 | d2 = | 1.54 | | |
| r3 = | −58.115 | d3 = | 5.55 | n2 = 1.84666 | v2 = 23.8 |
| r4 = | −10.855 | d4 = | 12.50 | | |
| r5 = | −60.724 | d5 = | 6.70 | n3 = 1.69680 | v3 = 55.5 |
| r6 = | −19.637 | d6 = | 3.09 | | |
| r7 = | 18.197 | d7 = | 4.25 | n4 = 1.69680 | v4 = 55.5 |
| r8 = | −640.730 | d8 = | 10.80 (Eye-Relief) | | |
| r9 = | ∞ | | | | |

Numerical Example 6:
f = 11.12; Pupil Diameter: φ2.8; 2ω = 60°

| | | | | | |
|---|---|---|---|---|---|
| r1 = | −7.379 | d1 = | 1.08 | n1 = 1.51633 | v1 = 64.2 |
| r2 = | 33.874 | d2 = | 1.57 | | |
| r3 = | −51.270 | d3 = | 6.04 | n2 = 1.80518 | v2 = 25.4 |
| r4 = | −10.825 | d4 = | 12.50 | | |
| r5 = | 144.180 | d5 = | 7.56 | n3 = 1.51633 | v3 = 64.2 |
| r6 = | −21.296 | d6 = | 1.89 | | |
| r7 = | 15.222 | d7 = | 4.63 | n4 = 1.51633 | v4 = 64.2 |
| r8 = | −465.992 | d8 = | 10.80 (Eye-Relief) | | |
| r9 = | ∞ | | | | |

Numerical Example 7:
f = 10.87; Pupil Diameter: φ2.8; 2ω = 30°

| | | | | | |
|---|---|---|---|---|---|
| r1 = | −7.887 | d1 = | 1.08 | n1 = 1.51742 | v1 = 52.4 |
| r2 = | 39.802 | d2 = | 1.64 | | |
| r3 = | −33.532 | d3 = | 5.09 | n2 = 1.83400 | v2 = 37.2 |
| r4 = | −10.601 | d4 = | 12.50 | | |
| r5 = | −577.539 | d5 = | 1.35 | n3 = 1.80518 | v3 = 25.4 |
| r6 = | 19.330 | d6 = | 9.43 | n4 = 1.62299 | v4 = 58.2 |
| r7 = | −16.915 | d7 = | 2.70 | | |
| r8 = | 16.880 | d8 = | 5.26 | n5 = 1.62299 | v5 = 58.2 |
| r9 = | 662.770 | d9 = | 10.80 (Eye-Relief) | | |
| r10 = | ∞ | | | | |

Numerical Example 8:
f = 10.83; Pupil Diameter: φ2.8; 2ω = 60°

| | | | | | |
|---|---|---|---|---|---|
| r1 = | −7.600 | d1 = | 1.08 | n1 = 1.51633 | v1 = 64.2 |
| r2 = | 42.435 | d2 = | 1.57 | | |
| r3 = | −34.507 | d3 = | 5.42 | n2 = 1.78590 | v2 = 44.2 |
| r4 = | −10.450 | d4 = | 12.50 | | |
| r5 = | 72.058 | d5 = | 1.35 | n3 = 1.74077 | v3 = 27.8 |
| r6 = | 16.435 | d6 = | 9.92 | n4 = 1.51633 | v4 = 64.2 |
| r7 = | −16.600 | d7 = | 1.90 | | |
| r8 = | 15.774 | d8 = | 5.48 | n5 = 1.51633 | v5 = 64.2 |
| r9 = | −138.490 | d9 = | 10.80 (Eye-Relief) | | |
| r10 = | ∞ | | | | |

Numerical Example 9:
f = 9.17; Pupil Diameter: φ2.3; 2ω = 60°

| | | | | | |
|---|---|---|---|---|---|
| r1 = | −6.056 | d1 = | 1.08 | n1 = 1.51633 | v1 = 64.2 |
| r2 = | 35.637 | d2 = | 1.86 | | |
| r3 = | −20.262 | d3 = | 4.84 | n2 = 1.84666 | v2 = 23.8 |
| r4 = | −9.019 | d4 = | 12.50 | | |
| r5 = | 1264.992 | d5 = | 7.37 | n3 = 1.60311 | v3 = 60.7 |
| r6 = | −19.376 | d6 = | 3.17 | | |
| r7 = | 15.385 | d7 = | 4.39 | n4 = 1.60311 | v4 = 60.7 |
| r8 = | 1805.489 | d8 = | 10.80 (Eye-Relief) | | |
| r9 = | ∞ | | | | |

Numerical Example 10:
f = 10.72; Pupil Diameter: φ2.8; 2ω = 60°

| | | | | | |
|---|---|---|---|---|---|
| r1 = | −7.887 | d1 = | 1.08 | n1 = 1.51742 | v1 = 52.4 |
| r2 = | 88.485 | d2 = | 1.65 | | |
| r3 = | −24.698 | d3 = | 4.72 | n2 = 1.83400 | v2 = 37.2 |
| r4 = | −10.503 | d4 = | 12.50 | | |
| r5 = | −50.095 | d5 = | 5.30 | n3 = 1.62299 | v3 = 58.2 |
| r6 = | −17.642 | d6 = | 3.29 | | |
| r7 = | 18.391 | d7 = | 8.34 | n4 = 1.60311 | v4 = 60.7 |
| r8 = | −12.333 | d8 = | 1.00 | n5 = 1.80518 | v5 = 25.4 |
| r9 = | −25.628 | d9 = | 9.00 (Eye-Relief) | | |
| r10 = | ∞ | | | | |

The values of the factors in the above-described conditions (8) to (15) for the numerical examples are listed in Table-2 below.

TABLE 2

| Condition | Numerical Example | | |
|---|---|---|---|
| No. | 4 | 5 | 6 |
| (8) | 1.293 | 1.229 | 1.333 |
| (9) | 0.642 | 0.602 | 0.642 |
| (10) | −1.551 | −1.459 | −1.492 |
| (11) | 0.33033 | 0.35917 | 0.28885 |
| (12) | 38.07 | 34.6 | 38.8 |
| (13) | — | — | — |
| (14) | −1.166 | −1.956 | −0.743 |
| (15) | 0.942 | 0.945 | 0.937 |

| Condition | Numerical Example | | | |
|---|---|---|---|---|
| No. | 7 | 8 | 9 | 10 |
| (8) | 1.337 | 1.401 | 1.613 | 1.365 |
| (9) | 0.669 | 0.696 | 0.709 | 0.836 |
| (10) | −1.925 | −1.869 | −2.604 | −2.480 |
| (11) | 0.31658 | 0.26957 | 0.33033 | 0.31658 |
| (12) | — | — | 38.07 | — |
| (13) | 24.97 | 28.2 | — | 25.8 |
| (14) | −1.060 | −0.626 | −0.970 | −2.086 |
| (15) | 1.052 | 0.795 | 1.017 | 1.644 |

It will be appreciated from the foregoing that according to the invention, four or five lens elements, that is, so few lens elements suffice for realizing an eyepiece lens well corrected for aberrations, particularly with the field curvature and astigmatism very improved, while still maintaining a long enough eye-relief. In application of the invention to eyepiece lenses of short focal length for binoculars of the compact form, it becomes possible to obtain an image without occurrence of blurring up to the edge of the field to be covered. In addition, such a binocular has a sufficiently long eye-relief. It is, therefore, very comfortable to look through it. Also there is a merit that, owing to the reduction of the total number of constituent lenses, the cost is remarkably reduced.

Another embodiment in which the lens number is further reduced is described below.

FIG. 21 to FIG. 24 are longitudinal section views of numerical examples 11 to 14 of eyepiece lenses of the invention.

A first lens unit G1 is in the form of a single lens or a minus-plus cemented lens of meniscus shape convex toward the light exit side whose power is gentle. In the case of the cemented lens, the negative lens should be positioned on the light entrance side.

A second lens unit G2 is arranged on the light exit side of the first lens unit G1 and has a positive power. It takes the form of a single lens or a minus-plus cemented lens having a convex surface of strong power facing the light exit side. The term "strong" power herein used means that this surface is stronger in the refracting power than the opposite one. In the space between the first lens unit G1 and the second lens unit G2, there is formed a middle image MP by the function of an objective lens (not shown).

A third lens unit G3 is arranged on the light exit side of the second lens unit G2 and has a positive power. It takes the form of a single lens or a plus-minus cemented lens having a convex surface of strong power facing the light entrance side. EP stands for an eye point.

The significance of the form and the arrangement of these lenses are explained below.

The reason why the meniscus lens convex toward the light exit side is arranged in a space of from the light entrance side to the middle image position is to direct the off-axial light beam upward so that the height of the off-axial light ray is made high at the middle image position to thereby elongate the eye-relief and also to well correct curvature of field. The meniscus lens has an effect as the field flattener. The use of such an arrangement results also in that the lenses take their places on either side of the middle image position. With this, the upper off-axial rays as viewed from the principal ray on the light entrance side becomes the lower ones on the light exit side, while the lower off-axial rays on the light entrance side becomes the upper ones on the light exit side. Therefore, the opposite aberrations are produced on both sides of the middle image position. Good correction of aberrations can thus be carried out.

Even in a space of from the middle image position to the light exit side, there are further arranged the second lens unit of positive refractive power and the third lens unit of positive refractive power. The reason for this is to enlarge the image in the air at the middle image position.

Further, the reason why the power of the light exit side of the second lens unit and the power of the light entrance side of the third lens unit are made strong is to minimize coma aberration.

At least one of the second and third lens units is made to be a cemented lens consisting of a negative lens and a positive lens cemented together, for the purpose of well correcting lateral and longitudinal chromatic aberrations. With this regard, the Abbe number of the negative lens is made smaller than that of the positive lens to insure that good correction of chromatic aberrations can be carried out.

Further, in the case where the second lens unit is the cemented lens, the negative lens should be arranged on the light entrance side. With this, the eye-relief can be taken long.

Alternatively, as a second construction and arrangement, the first lens unit may be made to be a cemented lens. This allows the first lens unit to be used in correcting chromatic aberrations.

Further, in the case where the first lens unit is constructed in the form of the cemented lens, because the chromatic aberrations can be corrected by the first lens unit, the second and third lens units each may be constructed in the form of a positive single lens.

Further, it is desirable to satisfy the following condition:

$$0.3 < r1i/r1e < 1.5 \quad (16)$$

For better results, either or both of the upper and lower limits of the condition (16) may be contracted to such as:

$$0.45 < r1i/r1e < 1.2$$

where
  r1$i$: the radius of curvature of the lens surface closest to the light entrance side of the first lens unit; and
  r1$e$: the radius of curvature of the lens surface closest to the light exit side of the first lens unit
Further, it is desirable to satisfy the following conditions:

$$-3 < SF2 < -0.3 \quad (17)$$

For better results, either or both of the upper and lower limits of the condition (17) may be contracted to such as:

$$-2 < SF2 < -0.5 \quad (18)$$

$$0.1 < SF3 < 3$$

For better results, either or both of the upper and lower limits of the condition (18) may be contracted to such as:

$$-0.25 < SF3 < 2.3$$

where
  SF2=(r2$e$+r2$i$)/(r2$e$−r2$i$)
  SF3=(r3$e$+r3$i$)/(r3$e$−r3$i$)
wherein
  r2$i$: the radius of curvature of the surface closest to the light entrance side of the second lens unit;
  r2$e$: the radius of curvature of the surface closest to the light exit side of the second lens unit;
  r3$i$: the radius of curvature of the surface closest to the light entrance side of the third lens unit; and
  r3$e$: the radius of curvature of the surface closest to the light exit side of the third lens unit Moreover, it is desirable that at least one of the second and third lens units is a cemented lens consisting of a negative lens and a positive lens cemented together. For this case, as one method, the first lens unit is formed to a single lens.

Again, it is desirable that the second lens unit is constructed, comprising, in order from the light entrance side, a negative lens and a positive lens, these lenses being cemented together to form a cemented lens.

Meanwhile, an eyepiece lens is preferably constructed, comprising, in order from the light entrance side, a first lens unit consisting of a negative lens and a positive lens, these lenses being cemented together to form a meniscus cemented lens convex toward the light exit side, followed after the middle image by a second lens unit of positive refractive power having a strong power on the light exit side and a third lens unit having a strong power on the light entrance side.

Further, it is desirable that, in the case of the first lens unit in the form of the cemented lens, the second and third lens units each take the form of a single lens and that the following condition is satisfied:

$$25 < v a - v1 p < 60 \quad (19)$$

For better results, either or both of the upper and lower limits of the condition (19) may be contracted to such as:

$$30 < v a - v1 p < 50$$

where
  v$a$: the mean value of the Abbe number of the negative lens in the first lens unit and of the second and third lens units; and
  v1$p$: the Abbe number of the positive lens in the first lens unit The significance of the conditions (16) to (19) are explained below.

The inequalities of condition (16) regulate the shape of the first lens unit. In a range beyond the lower limit of the condition (16), because the radius of curvature of the lens surface closest to the light entrance side of the first lens unit is too small, coma and astigmatism increase greatly. In a range beyond the upper limit of the condition (16), because the power on the light entrance side of the first lens unit is too weak, it becomes impossible to increase the eye-relief. So, these are no good.

The inequalities of conditions (17) and (18) regulate the shapes of the second and third lens units. Outside the ranges of the conditions (17) and (18), coma increases objectionably.

The inequalities of condition (19), on assumption that the first lens unit is the cemented lens, give a range for the difference between the Abbe number of the positive lens in the first lens unit and the mean value of the Abbe numbers of the negative lens in the first lens unit and of the second and third lens units. In a range beyond the lower limit of the condition (19), lateral and longitudinal chromatic aberrations both are under-corrected. In a range beyond the upper limit of the condition (19), lateral and longitudinal chromatic aberrations both are over-corrected. So, these are no good.

Next, four numerical examples 11 to 14 of the invention are shown. The aberrations of the numerical examples 11 to 14 are shown in FIGS. 25A–25D to 28A–28D, respectively. In the numerical data, ri: the radius of curvature of the i-th lens surface, when counted from the light entrance side;

di: the i-th axial separation between the surfaces, when counted from the light entrance side;

ni: the refractive index of the i-th lens element, when counted from the light entrance side; and vi: the Abbe number of the i-th lens element, when counted from the light entrance side Numerical Example 11:
f = 10.84; Pupil Diameter: φ2.8; 2ω = 60°

| r1 = | −7.424 | d1 = | 5.51 | n1 = 1.51633 | v1 = 64.2 |
| r2 = | −8.980 | d2 = | 11.71 | | |
| r3 = | 728.526 | d3 = | 1.50 | n2 = 1.80518 | v2 = 25.4 |
| r4 = | 15.448 | d4 = | 7.76 | n3 = 1.60311 | v3 = 60.7 |
| r5 = | −15.043 | d5 = | 0.31 | | |
| r6 = | 12.116 | d6 = | 4.84 | n4 = 1.60311 | v4 = 60.7 |
| r7 = | 59.684 | d7 = | 10.80 (Eye-Relief) | | |
| r8 = | ∞ | | | | |

Numerical Example 12:
f = 10.85; Pupil Diameter: φ2.8; 2ω = 60°

| r1 = | −7.500 | d1 = | 4.00 | n1 = 1.65844 | v1 = 50.9 |
| r2 = | −8.769 | d2 = | 10.00 | | |
| r3 = | −105.565 | d3 = | 1.30 | n2 = 1.80518 | v2 = 25.4 |
| r4 = | 15.063 | d4 = | 7.50 | n3 = 1.62299 | v3 = 58.2 |
| r5 = | −14.807 | d5 = | 0.20 | | |
| r6 = | 12.899 | d6 = | 5.06 | n4 = 1.62299 | v4 = 58.2 |
| r7 = | 246.780 | d7 = | 10.80 (Eye-Relief) | | |
| r8 = | ∞ | | | | |

Numerical Example 13:
f = 11.30; Pupil Diameter: φ2.8; 2ω = 60°

| r1 = | −7.502 | d1 = | 6.85 | n1 = 1.51633 | v1 = 64.2 |
| r2 = | −9.679 | d2 = | 12.50 | | |
| r3 = | −135.929 | d3 = | 6.61 | n2 = 1.60311 | v2 = 60.7 |
| r4 = | −20.879 | d4 = | 0.25 | | |
| r5 = | 14.725 | d5 = | 8.05 | n3 = 1.60311 | v3 = 60.7 |
| r6 = | −15.900 | d6 = | 1.00 | n4 = 1.80518 | v4 = 25.4 |
| r7 = | −52.785 | d7 = | 10.80 (Eye-Relief) | | |
| r8 = | ∞ | | | | |

Numerical Example 14:
f = 11.29; Pupil Diameter: φ2.8; 2ω = 60°

| r1 = | −6.257 | d1 = | 1.08 | n1 = 1.51633 | v1 = 64.2 |
| r2 = | −18.672 | d2 = | 4.56 | n2 = 1.84666 | v2 = 23.8 |
| r3 = | −9.713 | d3 = | 12.50 | | |

-continued

| r4 = | 626.923 | d4 = | 7.29 | n3 = 1.60311 | v3 = 60.7 |
| r5 = | −20.230 | d5 = | 0.80 | | |
| r6 = | −14.429 | d6 = | 4.16 | n4 = 1.60311 | v4 = 60.7 |
| r7 = | 319.110 | d7 = | 10.80 (Eye-Relief) | | |
| r8 = | ∞ | | | | |

TABLE 3

| Condition | Numerical Example | | | |
| --- | --- | --- | --- | --- |
| No. | 11 | 12 | 13 | 14 |
| (16) | 0.827 | 0.836 | 0.775 | 0.644 |
| (17) | −0.960 | −1.326 | −1.363 | −0.937 |
| (18) | 1.512 | 1.127 | 0.564 | 1.095 |
| (19) | — | — | — | 38.07 |

As has been described above, according to the invention, the total number of constituent lenses is reduced to as few as four or five. Nonetheless, particularly the amount of field curvature and astigmatism is very small and the eye-relief can be made long enough. In application of the invention to eyepiece lenses of short focal length for binoculars of the compact form, therefore, it becomes possible to obtain an image without occurrence of blurring up to the edge of the field to be covered. In addition, such a binocular has a sufficiently long eye-relief. It is, therefore, very comfortable to look through it. Also there is a merit that, owing to the reduction of the total number of constituent lenses, the cost is remarkably reduced.

What is claimed is:

1. An eyepiece lens comprising, in order from an observed plane side, a positive first lens unit having a strong positive refracting surface facing an observing side, a negative second lens unit having a strong negative refracting surface facing the observed plane side, a positive third lens unit having a strong positive refracting surface facing the observing side, a positive fourth lens unit and a fifth lens unit of meniscus shape convex toward the observed plane side, wherein, letting the radius of curvature of the i-th lens surface when counted from the observed plane side be denoted by Ri, the i-th axial lens thickness or air separation by Di and the focal length of the entire system by f, the following conditions are satisfied:

$$1.8 \leq R2/R3 < 3$$

$$0.3 \leq D2/f < 0.45.$$

2. An eyepiece lens according to claim 1, wherein said fifth lens unit is a cemented lens composed of a negative lens of meniscus shape convex toward the observed plane side and a positive lens of meniscus shape convex toward the observed plane side cemented together.

3. An eyepiece lens according to claim 2, satisfying the following condition:

$$1 < f5/f2 < 2$$

where f2 and f5 are the focal lengths of the second and fifth lens units, respectively.

4. An eyepiece lens according to claim 2 or 3, satisfying the following conditions:

$$0.05 < NP - N2 < 0.16$$
$$10 < \nu P - \nu 2 < 25$$

where N2 and ν2 are respectively the refractive index and Abbe number of the material of said second lens unit and, NP and νP are respectively the mean values of the refractive indices and Abbe numbers of the materials of positive lenses in said eyepiece lens.

5. An eyepiece lens according to claim 2 or 3, satisfying the following conditions:

$$0.05 < N5 - NP < 0.18$$
$$20 < \nu P - \nu 5 < 35$$

where N5 and ν5 are respectively the refractive index and Abbe number of the material of said fifth lens unit, and NP and νP are respectively the mean values of the refractive indices and Abbe numbers of the materials of positive lenses in said eyepiece lens.

* * * * *

UNITED STATES PATENT AND TRADEMARK OFFICE
CERTIFICATE OF CORRECTION

PATENT NO.    : 6,008,949
DATED         : December 28, 1999
INVENTOR(S)   : Saburo Sugawara It is certified that error appears in the above-identified patent and that said Letters Patent is hereby corrected as shown below:

Column 1:
Line 26, "Anther" should read -- Another --.
Line 28, "600" should read -- 60° --.
Line 47, "6° " should read -- 60° --.

Column 3:
Line 39, "Figs. 4 to 6" should read -- Figs. 4A-4D to 6A-6D --.

Column 5:
Line 50, "υi and ni" should read -- Ni and υi --.
Line 52, "υP and nP" should read -- NP and υP --.

Column 6:
Line 55, (Numerical Example 1), "υ6=53 8" should read -- υ6=53.8 --.

Column 8:
Line 44, "43" should read -- r3 -- .

UNITED STATES PATENT AND TRADEMARK OFFICE
CERTIFICATE OF CORRECTION

PATENT NO.    : 6,008,949
DATED         : December 28, 1999
INVENTOR(S)   : Saburo Sugawara It is certified that error appears in the above-identified patent and that said Letters Patent is hereby corrected as shown below:

<u>Column 12:</u>
Line 54, "comented" should read -- cemented --.

<u>Column 15:</u>
Line 52 (Numerical Example 12), "r7=246.780" should read -- r7=216.780 --.

Signed and Sealed this

Twenty-fifth Day of September, 2001

Attest:

NICHOLAS P. GODICI
*Attesting Officer*   *Acting Director of the United States Patent and Trademark Office*